United States Patent
Lee

(10) Patent No.: US 10,146,087 B2
(45) Date of Patent: Dec. 4, 2018

(54) BACKLIGHT UNIT AND LIQUID CRYSTAL DISPLAY DEVICE INCLUDING THE SAME

(71) Applicant: LG Display Co., Ltd., Seoul (KR)

(72) Inventor: In Wha Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 174 days.

(21) Appl. No.: 14/975,610

(22) Filed: Dec. 18, 2015

(65) Prior Publication Data

US 2017/0023828 A1 Jan. 26, 2017

(30) Foreign Application Priority Data

Jul. 21, 2015 (KR) .................. 10-2015-0103307

(51) Int. Cl.
*G02F 1/1335* (2006.01)

(52) U.S. Cl.
CPC .. *G02F 1/133608* (2013.01); *G02F 1/133603* (2013.01); *G02F 1/133606* (2013.01); *G02F 1/133605* (2013.01); *G02F 1/133611* (2013.01)

(58) Field of Classification Search
CPC ......... G02F 1/133603; G02F 1/133606; G02F 1/133608
See application file for complete search history.

(56) References Cited

U.S. PATENT DOCUMENTS

| | | | |
|---|---|---|---|
| 8,085,362 B2 * | 12/2011 | Harada | G02F 1/133604 349/58 |
| 8,870,407 B2 * | 10/2014 | Kim | F21S 8/02 362/217.02 |
| 2002/0030993 A1 * | 3/2002 | Itoh | F21S 8/00 362/246 |
| 2003/0234896 A1 | 12/2003 | Kim | |
| 2007/0047264 A1 * | 3/2007 | Joo | G02F 1/133608 362/633 |
| 2008/0252808 A1 | 10/2008 | Chang | |
| 2010/0027241 A1 | 2/2010 | Nakanishi | |
| 2014/0211121 A1 | 7/2014 | Cho et al. | |

* cited by examiner

*Primary Examiner* — Dung Nguyen
(74) *Attorney, Agent, or Firm* — Fenwick & West LLP

(57) ABSTRACT

A backlight unit comprises a plurality of point light sources facing a rear surface of a liquid crystal panel; a bottom cover comprising a lower surface supporting the plurality of point light sources and two or more side surfaces disposed between the lower surface of the bottom cover and the liquid crystal panel; and a support side in contact with a first side surface of the bottom cover's side surfaces and in contact with the lower surface of the bottom cover in order to change a path of light from the plurality of point light sources toward the liquid crystal panel, the support side including a plurality of support side members oriented at different angles relative to the bottom cover.

19 Claims, 12 Drawing Sheets

BACKLIGHT UNIT AND LIQUID CRYSTAL DISPLAY DEVICE INCLUDING THE SAME

CROSS REFERENCE TO RELATED APPLICATIONS

This application claims the benefit of the Korean Patent Application No. 10-2015-0103307, filed on Jul. 21, 2015, which is hereby incorporated by reference for all purposes as if fully set forth herein.

BACKGROUND OF THE INVENTION

Field of the Invention

The present invention relates to a backlight unit and a liquid crystal display device including the same, and more particularly, to a direct-type backlight unit and a liquid crystal display device including the same.

Discussion of the Related Art

Portable electronic devices such as mobile terminals and notebook computers typically include flat panel display devices.

Example flat panel display devices include a liquid crystal display device, a plasma display panel, a field emission display device, a light emitting diode display device, and an organic light emitting diode display device.

Among the flat panel display devices, the liquid crystal display device has advantages such as highly developed mass-production technology, easy driving means, low power consumption, high definition resolution, and large screen size.

Since the liquid crystals themselves do not emit light, the liquid crystal display device includes a separate light source such as a backlight unit provided with a light-emitting diode (LED) on a rear surface to irradiate light toward the surface of the liquid crystal panel in order to display an identifiable image.

Backlight units may be categorized into direct-type backlight units and edge-type backlight units. In a direct-type backlight unit, light sources are arranged below a liquid crystal panel. In an edge-type backlight unit, a light source is arranged to face a side of a light guide plate, and a plurality of optical sheets are arranged between the liquid crystal panel and the light guide plate.

FIG. 1 is a cross-sectional view illustrating a related art liquid crystal display device that includes a direct-type backlight unit. The direct-type backlight unit has a structure where a plurality of optical sheets 5 and a diffuser plate 4 are disposed below a liquid crystal panel 6, and a plurality of light sources 1 are arranged below the diffuser plate 4. Light generated from the light sources 1 is scattered and refracted through the diffuser plate 4 and the optical sheets 5, and then spreads toward an entire surface of the liquid crystal panel 6. The liquid crystal display device also includes a bottom cover 7, a guide panel 8, and a case top 9 to secure the light sources 1, diffuser plate 4, optical sheets 5, and liquid crystal panel 6.

If the light sources 1 are arranged below the diffuser plate 4 as shown in FIG. 1, a deviation of light supplied to an edge area of the liquid crystal panel 6 and the other areas is generated, which results in non-uniform display color across the surface of the liquid crystal panel 6.

FIG. 2 is a cross-sectional view illustrating a related art liquid crystal display device that includes a direct-type backlight unit having a support side 3. As shown in FIG. 2, support sides 3 having a shape tilted with respect to bottom cover 7 are arranged at both sides of the light sources 1. A path of light generated from the light sources 1 is changed by the support side 3 in order to increase light supplied to an edge area of liquid crystal panel 6. The liquid crystal display device also includes a guide panel 8 and a case top 9 to secure the diffuser plate 4, optical sheets 5, and liquid crystal panel 6.

As the liquid crystal display device's bezel becomes narrow, the support side 3 is arranged on a rear surface of an active area where an image is displayed on the liquid crystal panel 6 as shown in FIG. 2. This results in non-uniformity of light in area S between the light source 1 and the support side 3, which causes the user to perceive relative darkness in area S.

FIG. 3 illustrates an image of light provided to a front surface of an area under "A-A" of the direct-type backlight unit of FIG. 2. In FIG. 3, a dark red color indicates that luminance is high as relatively more light is provided, and a faded red color indicates that luminance is low as relatively less light is provided. The amount of light reaching the area S of FIGS. 2 and 3 is less than light reaching the other areas. When an image is displayed by the liquid crystal panel, the image formed in area S is relatively darker than the image formed in other areas.

As described above, the related art direct-type liquid crystal display device has a problem that a dark area is generated in the edge area of the liquid crystal panel by non-uniform light supply.

It is difficult to provide a large sized screen of 100 inches or more as a single display device. Technology called a VideoWall, MultiVision, or multiple unit display device has been developed.

The MultiVision display device is a display device that provides a large sized screen by continuously arranging a plurality of unit display devices in horizontal and vertical directions. The MultiVision display device displays different images on each unit display device or displays one image which is divided on each unit display device.

Particularly, when multiple images are displayed by a display device, more important images are generally displayed in a center area of the display device and the less important images are displayed towards edge areas of the display device.

Therefore, if one image is divided for display on unit display devices in the MultiVision display device, the more important image is displayed by the unit display device arranged at the center of the overall display device. As a result, a dark area is generated in the edge area of the unit display device that is arranged at the center.

In this way, if one image is divided for display through unit display devices of the MultiVision display device, problems occur in that a dark area may occur in an important image, and a user may perceive quality deterioration more seriously than when the unit display devices each display different images.

SUMMARY OF THE INVENTION

Accordingly, the present invention is directed to a backlight unit and a liquid crystal display device including the same.

An example advantage of the disclosed embodiments is to provide a backlight unit and a liquid crystal display device including the same, in which luminance uniformity is improved over the display area of a liquid crystal panel by reducing light non-uniformity generated in an edge area of the liquid crystal panel.

Another example advantage of the disclosed embodiments is to provide a backlight unit and a liquid crystal display including the same, in which luminance uniformity is improved over the display areas of a multiple unit display device by reducing light non-uniformity generated in edge areas of unit liquid crystal display devices constituting a multiple unit display device.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

A backlight unit according to one embodiment comprises a plurality of point light sources facing a rear surface of a liquid crystal panel; a bottom cover comprising a lower surface supporting the plurality of point light sources and two or more side surfaces disposed between the lower surface of the bottom cover and the liquid crystal panel; and a support side in contact with a first side surface of the bottom cover's side surfaces and in contact with the lower surface of the bottom cover in order to change a path of light from the plurality of point light sources toward the liquid crystal panel, the support side including a plurality of support side members oriented at different angles relative to the lower surface of the bottom cover.

In another aspect, a liquid crystal display device according to one embodiment comprises a backlight unit that includes a plurality of point light sources, a bottom cover, and a support side including a plurality of support side members oriented at different angles relative to a lower surface of the bottom cover to change the path of light from the plurality of light sources in different directions, and a liquid crystal panel displaying an image by using the light irradiated from the backlight unit.

In another aspect, a multiple unit display device according to one embodiment comprises a plurality of liquid crystal display devices aligned in horizontal and vertical directions, each of the liquid crystal display devices including a backlight unit that includes a plurality of point light sources, a bottom cover, and a support side including a plurality of support side members oriented at different angles relative to a lower surface of the bottom cover to change the path of light from the plurality of light sources in different directions.

It is to be understood that both the foregoing general description and the following detailed description of the present invention provide examples intended to further explain the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Figure 1:
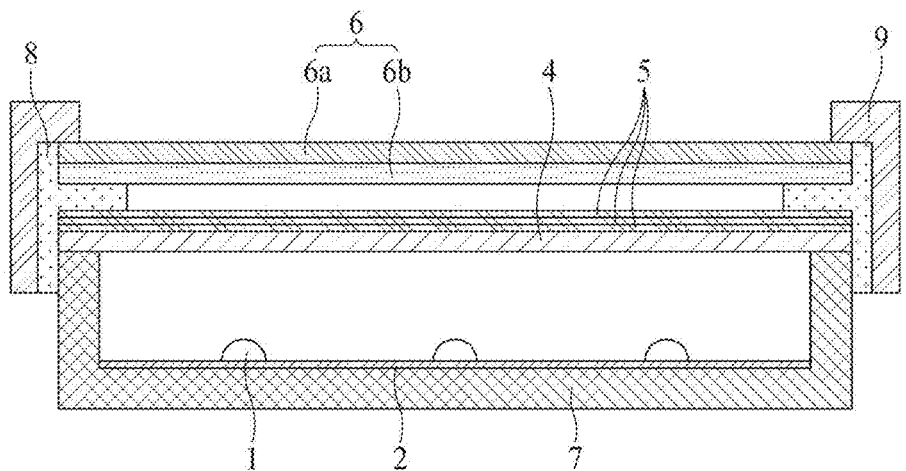
FIG. 1 is a cross-sectional view illustrating a related art liquid crystal display device that includes a direct-type backlight unit.
Figure 2:
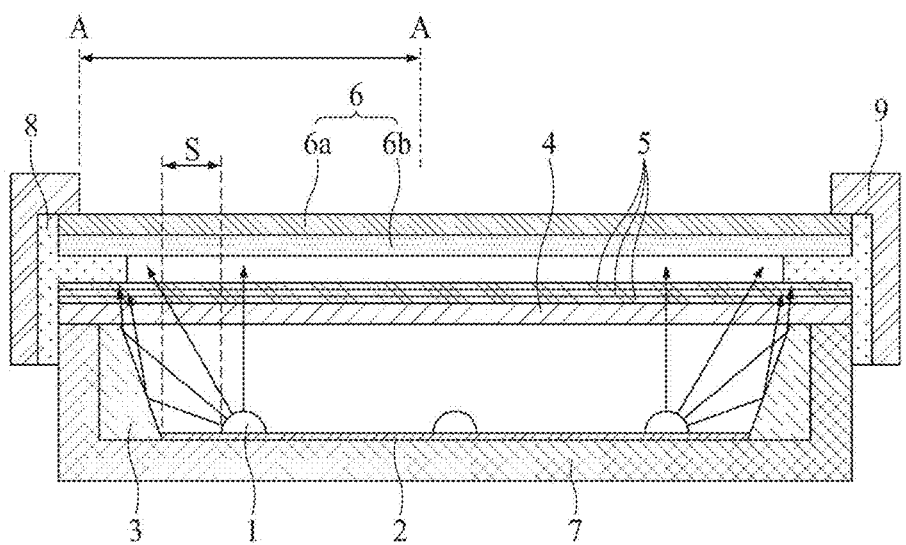
FIG. 2 is a cross-sectional view illustrating a related art liquid crystal display device that includes a direct-type backlight unit having a support side.

Advantages and features of the present invention, and implementation methods thereof will be clarified through the following embodiments described with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Further, the present invention is defined only by the scope of claims.

Any shape, size, ratio, angle, or number disclosed in the drawings for describing embodiments of the present invention is merely an example, and thus, the present invention is not limited to the illustrated details. Like reference numerals refer to like elements throughout. In the following description, when the detailed description of a relevant known element, function, or configuration is determined to unnecessarily obscure the disclosed embodiments, that item's detailed description may be omitted. Where "comprise," "have," and "include" are used in the present specification, one or more additional parts may be included unless "only" is used. A term described in the singular form also refers to the term's plural form absent indications to the contrary.

Elements should be construed as including an error range or tolerance even if there is no explicit mention of such an error range or tolerance.

In the description of embodiments, when a structure (e.g., an electrode, a line, a wire, a layer, a contact) is described as being formed on an upper portion or lower portion of another structure, on the other structure, or under the other structure, the description should be construed as describing both a case where the structures directly contact each other and a case where a third structure is disposed therebetween.

In describing a temporal relationship using temporal descriptors such as "after," "subsequent," "next," or "before," the description refers to a case with an adjacent temporal order or a non-adjacent temporal order unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element without departing from the scope of the present invention.

Features of various embodiments may be partially or overall coupled to or combined with each other, and may be variously inter-operated with each other and driven technically as those skilled in the art can understand. The disclosed embodiments may be implemented independently from each other, or may be implemented together in a co-dependent relationship.

Hereinafter, embodiments will be described in detail with reference to the accompanying drawings.

Figure 4:
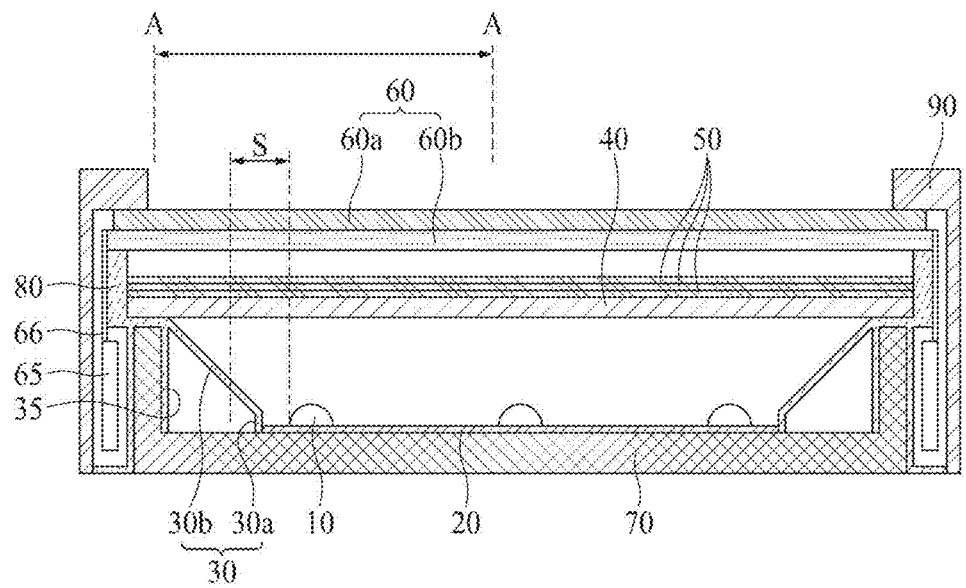
FIG. 4 is a cross-sectional view illustrating a backlight unit and a liquid crystal display device including the same according to one embodiment.

FIG. 4 is a cross-sectional view illustrating a backlight unit and a liquid crystal display device including the same according to one embodiment.

As shown in FIG. 4, the backlight unit includes a plurality of optical sheets 50 and a diffuser plate 40 deposited on a rear surface of a liquid crystal panel 60 as well as a plurality of light sources 10 arranged below the diffuser plate 40. The backlight unit includes a reflective unit 20 on a rear surface of the light sources 10. The reflective unit 20 reflects light toward the liquid crystal panel 60. The reflective unit 20 is disposed in a bottom cover 70 together with the light sources 10. The bottom cover 70 includes a lower surface and two or more side surfaces disposed between the lower surface and the liquid crystal panel 60.

The optical sheets 50 and the diffuser plate 40 are supported by the bottom cover 70 and a support side 30. The support side 30 contacts the side surface of the bottom cover 70 and the lower surface of the bottom cover 70 (via reflective unit 20, if present). A guide panel 80 supports the liquid crystal panel 60, which includes an upper substrate 60a and a lower substrate 60b. The support side 30 is a material that reflects and diffuses light to improve uniformity of the reflected light. For example, the support side 30 is made from a plastic polymer material such as white polyethylene terephthalate (PET), polystyrene, or poly(m-ethyl methacrylate) (PMMA). The support side 30 may be shaped as a sheet or a member.

Although the support side 30 and the guide panel 80 are provided in a single body in the embodiment of FIG. 4, other embodiments may differ from the example of FIG. 4. Therefore, the support side 30 and the guide panel 80 may be provided separately. Also, the support side 30 may further include a support side member 35 disposed at a side of the bottom cover 70 in order to fix the support side 30 onto the bottom cover 70. However, in other embodiments, the support side 30 does not include the support side member 35. In another embodiment, the support side 30 and the guide panel 80 are shown separately, and the support side member 35 is omitted.

A printed circuit board 65 is connected along at least one edge of the liquid crystal panel 60 through a connection member 66 such as a flexible printed circuit board (FPCB) or a tape carrier package (TCP).

Also, a case top 90 may be provided in a shape of a rectangular frame to cover an upper surface and a side of the liquid crystal panel 60. An image may be displayed on the liquid crystal panel 60 through an open area in the case top 90.

The support side 30 of the backlight unit according to one embodiment changes a path of light provided from the light sources 10 toward the liquid crystal panel 60 on both ends of the light sources 10. The support side 30 may include a plurality of support side members respectively oriented at different positions and angles relative to the bottom cover 70 in order to change the path of light in different directions to uniformly provide light to a surface of the liquid crystal panel 60.

In detail, the support side 30 includes a first support side member 30a spaced apart from the light sources 10 at a predetermined distance and disposed on a lower surface of the bottom cover 70 as well as a second support side member 30b disposed at a side of the bottom cover 70. The support side 30 changes the path of the light provided by the light sources 10.

In more detail, one end of the first support side member 30a is disposed on the lower surface of the bottom cover 70, and the second support side member 30b is tilted from the other end of the first support side member 30a to the side of the bottom cover 70.

Since the support side 30 changes the path of the light in order to provide light to the edge area of the liquid crystal panel 60, the second support side member 30b may be disposed at a slanted angle from the side of the bottom cover 70 to the other end of the first support side member 30a in order to reflect the light of the light sources 10 toward the liquid crystal panel 60.

Figure 3:
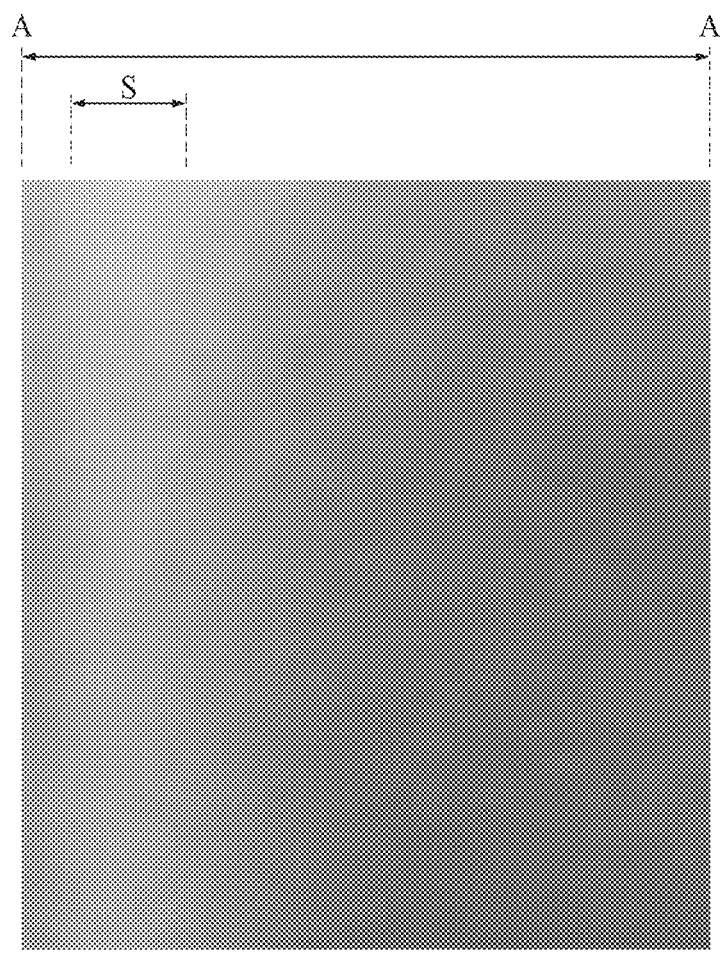
FIG. 3 illustrates an image of light provided to a front surface of an area under "A-A" of the direct-type backlight unit of FIG. 2.

The first support side member 30a and the second support side member 30b are positioned based on a predetermined condition in order to provide the light to the edge area of the liquid crystal panel 60, such as the area S of FIG. 3.

Hereinafter, for convenience of description, the backlight unit and the liquid crystal display device according to one embodiment will be described based on a simplified drawing. Various modifications may be made in elements within the range that does not depart from the technical spirit of the disclosed embodiments.

Figure 5:
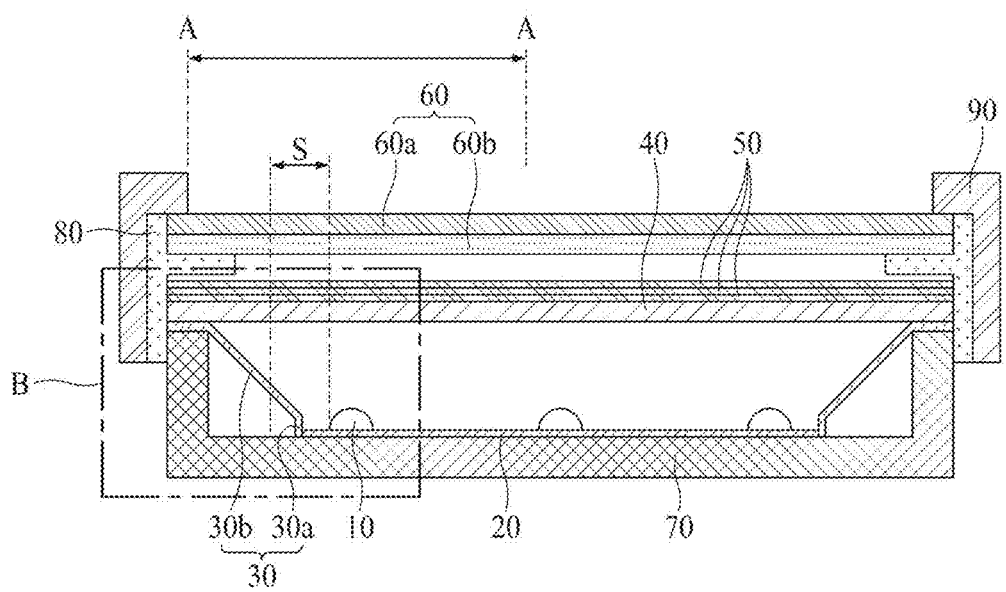
FIG. 5 is a cross-sectional view illustrating a backlight unit and a liquid crystal display device including the same according to a first embodiment.

FIG. 5 is a cross-sectional view illustrating a backlight unit and a liquid crystal display device including the same according to a first embodiment.

Figure 6:
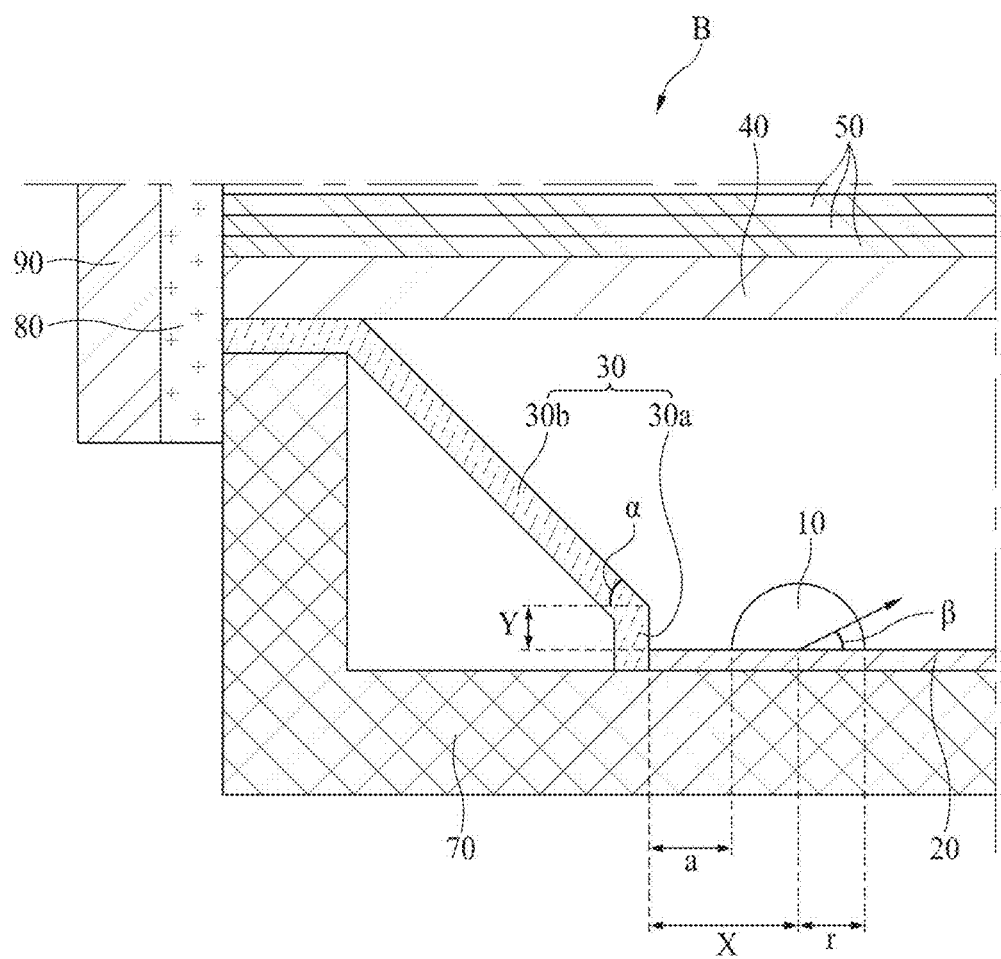
FIG. 6 is an enlarged cross-sectional view of area "B" illustrated in FIG. 5 in accordance with an embodiment of the backlight unit.

FIG. 6 is an enlarged cross-sectional view of area "B" illustrated in FIG. 5 in accordance with an embodiment of the backlight unit.

As shown in FIGS. 5 and 6, the backlight unit according to the first embodiment includes a plurality of light sources 10 facing a rear surface of a liquid crystal panel 60, a bottom cover 70 for storing the plurality of light sources 10, and a support side 30 changing a path of the light provided from the light sources 10 toward the liquid crystal panel 60 on both ends of the plurality of light sources 10.

According to one embodiment, the plurality of light sources 10 may be point light sources such as LEDs having a hemisphere shape.

Particularly, the support side 30 according to the first embodiment is disposed at each of different positions of the bottom cover 70 such that the path of the light is changed in different directions in order to more uniformly provide light to the surface of the liquid crystal panel 60.

In detail, the support side 30 according to the first embodiment includes a first support side member 30a spaced apart from the light sources 10 at a predetermined distance and disposed on the lower surface of the bottom cover 70 and a second support side member 30b disposed on the side of the bottom cover 70. The support side 30 changes the path of the light provided from the light sources 10 in different directions.

In more detail, one end of the first support side member 30a is disposed on the lower surface of the bottom cover 70, and the second support side member 30b is tilted from the other end of the first support side member 30a to the side of the bottom cover 70. As shown in FIG. 6, the second support side member 30b may extend to cover an upper portion of the side of the bottom cover 70 supporting the diffuser plate 40. However, the second support side member 30b may be positioned against the side of the bottom cover 70.

Since the support side 30 according to the first embodiment changes the path of the light toward the edge area of the liquid crystal panel 60, the second support side member 30b may be positioned at a slanted angle from the side of the bottom cover 70 to the other end of the first support side member 30a in order to reflect light from the light sources 10 toward the liquid crystal panel 60.

The first support side member 30a and the second support side member 30b are positioned based on a predetermined condition in order to provide light to the edge area of the liquid crystal panel 60, such as the area S of FIG. 3.

Hereinafter, a detailed condition for arrangement of the first support side member 30a and the second support side member 30b will be described.

The first support side member 30a is spaced apart from the light sources 10 at a predetermined distance as described above, and then is disposed on the lower surface of the bottom cover 70. In detail, a distance X from the first support side member 30a to the center of the light sources 10 is provided by the following Equation 1.

$$X = r + a \ (0 \ mm \leq a \leq 10 \ mm) \quad \text{[Equation 1]}$$

r denotes a radius of the light source 10, and a denotes a distance from the first support side member 30a to the outermost edge of the light source 10. When the light source 10 has a hemisphere shape, r denotes a radius of the light source 10, but if the light source 10 does not have a hemisphere shape, r may denote a distance from the center of the light sources 10 to the outermost edge where the light source 10 is in contact with the bottom cover 70 or the reflective unit 20. In other words, if the light sources 10 are directly positioned on the bottom cover 70 as the backlight unit according to one embodiment does not include the reflective unit 20, r denotes the distance from the center of the light sources 10 to the outermost edge where the light sources 10 are in contact with the bottom cover 70. If the light sources 10 are disposed on a reflective unit 20 included in the backlight unit, r indicates the distance from the center of the light sources 10 to the outermost edge where the light sources 10 are in contact with the reflective unit 20.

The first support side member 30a may be spaced apart from the center of the light source 10 by as much as X as expressed in Equation 1, or the first support side member 30a may be positioned on the lower surface of the bottom cover 70 by being positioned relative to the outermost edge of the light sources 10 by as much as a.

Since it is difficult to provide light between the first support side member 30a and the light sources 10, the first support side member 30a is positioned at a distance within X from the center of the light sources 10.

Figure 7A:
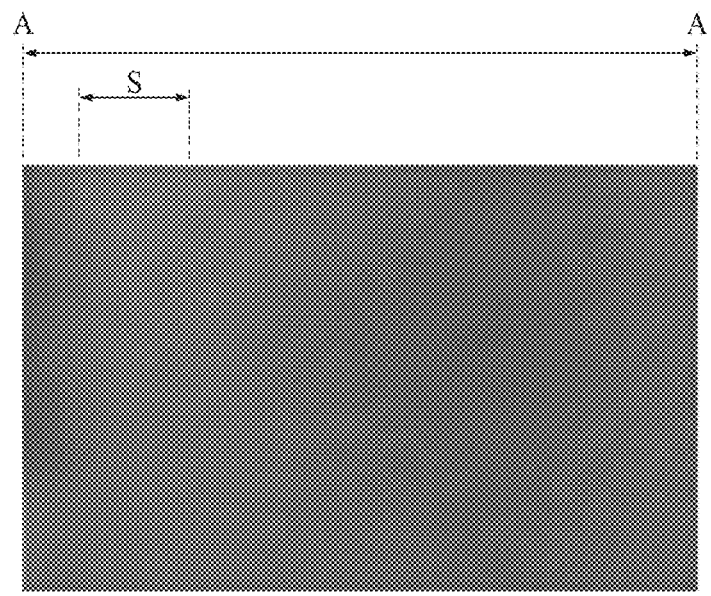
FIGS. 7a, 7b, and 7c illustrate comparison images of light provided to a liquid crystal panel if a spacing distance between a first support side member and a light source satisfies a condition according to an embodiment.
Figure 7B:
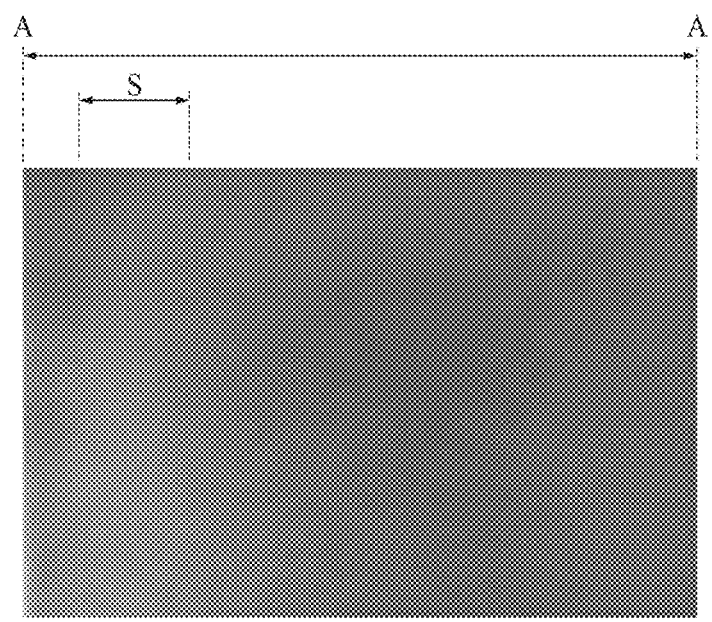
Figure 7C:
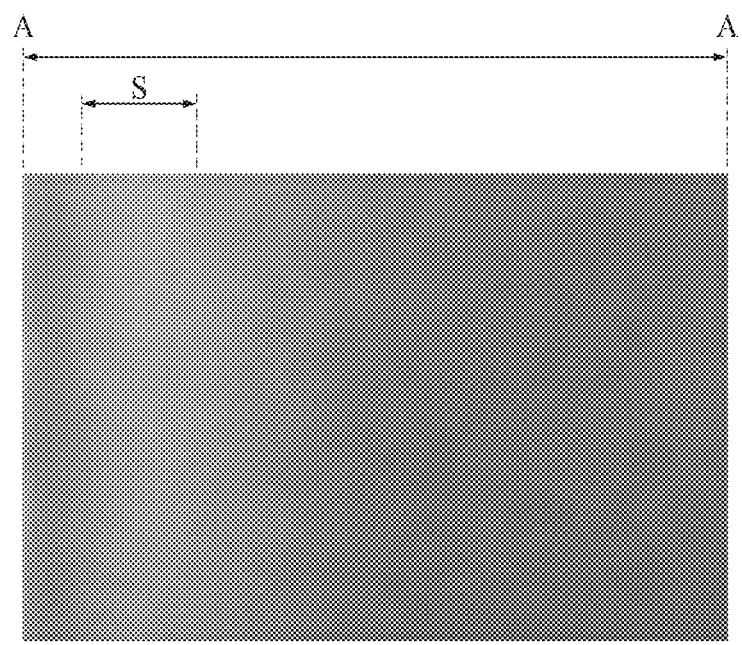

FIGS. 7a to 7c show images indicating the light provided to the liquid crystal panel 60. The images demonstrate the difference between (a) positioning the first support side member 30a a distance within X from the center of the light sources 10 and (b) positioning the first support side member 30a a distance more than X from the center of the light sources 10. The dark red color of the image indicates that relatively more light is provided to the edge area of the liquid crystal panel 60. The faded red color of the image indicates that relatively less light is provided to the edge area of the liquid crystal panel 60.

FIGS. 7a, 7b, and 7c illustrate comparison images obtained by changing a distance a from the first support side member 30a to the outermost edge of the light source 10 while maintaining other conditions for arrangement of the support side 30.

FIG. 7a illustrates an experimental image when the distance from the first support side member 30a to the outermost edge of the light sources 10 is 8 mm, FIG. 7b illustrates an experimental image when the distance from the first support side member 30a to the outermost edge of the light sources 10 is 10 mm, and FIG. 7c illustrates an experimental image when the distance from the first support side member 30a to the outermost edge of the light sources 10 is 12 mm.

Since light is uniformly provided to the liquid crystal panel 60 in FIGS. 7a and 7b, the positioning of the support side 30 prevents a dark area that impedes visibility of the displayed image. However, if the first support side member 30a is spaced apart from the center of the light sources 10 at a predetermined distance of at least X as shown in FIG. 7c, less light is provided to the area S between the first support side member 30a and the light sources 10. If the image is displayed through the liquid crystal panel 60 in this configuration, the area S is formed to be relatively darker than the other areas.

A height Y of the first support side member 30a from the lower surface of the bottom cover 70 is provided by the following Equation 2.

$$Y = X^* \tan \beta + b \ (0 \ mm \leq b \leq 3 \ mm) \quad \text{[Equation 2]}$$

β denotes a light orientation angle of the light sources 10 with respect to the bottom cover 70. In particular, a light source 10 illuminates points having an angle to the center of the light source 10 that is greater than or equal to the light orientation angle β. Points having an angle to the center of the light source 10 that is less than the light orientation angle β are substantially not illuminated by the light source 10.

X*tan β corresponds to a lower illumination height of the bottom cover 70 through which light passes at the distance X where the first support side member 30a is spaced apart from the light source 10. In other words, portions of the first support side member 30a at or above the lower illumination height are lit by the light source 10, and portions of the first support side member 30a below the lower illumination height are substantially not illuminated by the light source 10.

Therefore, as expressed by Equation 2, the first support side member 30a is longer than the upper height of the bottom cover 70 through which light passes at the distance X from the light sources 10 by as much as the predetermined length b.

Figure 8A:
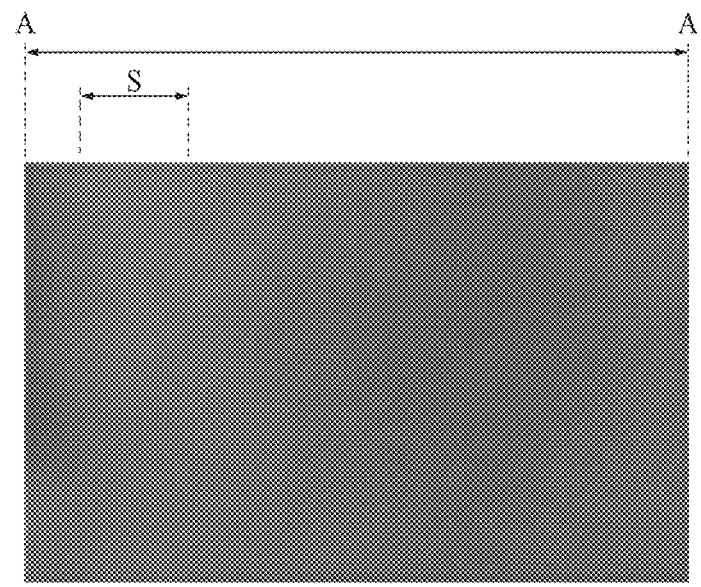
FIGS. 8a, 8b, and 8c illustrate comparison images of light provided to a liquid crystal panel in an embodiment where a height of a first support side member satisfies a condition.
Figure 8B:
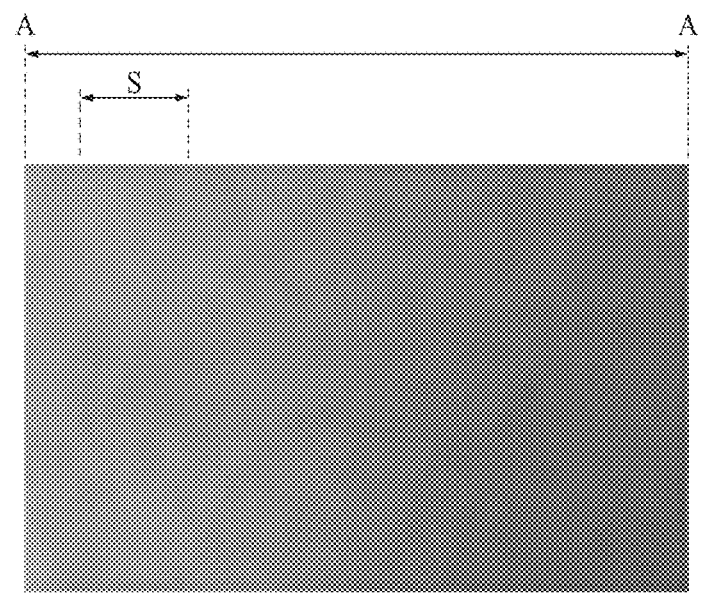
Figure 8C:
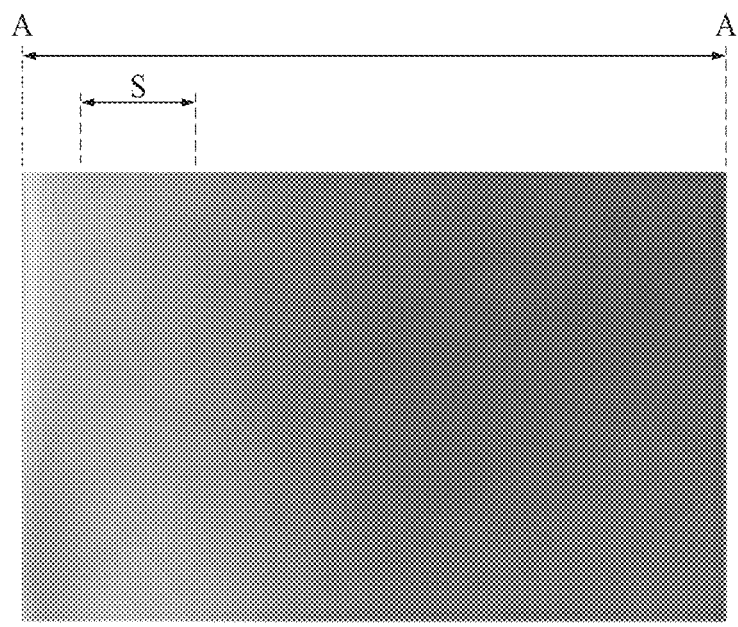

Results of a comparison between an image displayed on the liquid crystal panel 60 if the height of the first support side member 30a satisfies the condition according to Equation 2 and an image indicating light provided to the liquid crystal panel 60 if the height of the first support side member 30a does not satisfy the condition according to Equation 2 are shown in FIGS. 8a to 8c.

FIGS. 8a, 8b, and 8c illustrate comparison images obtained by changing only the length b while maintaining the other conditions for arrangement of the support side 30 except the distance condition.

FIG. 8a illustrates an experimental image when the predetermined length b is 2 mm, FIG. 8b illustrates an experimental image when the predetermined length b is 3 mm, and FIG. 8c illustrates an experimental image when the predetermined length b is 4 mm.

Since light is uniformly provided to the liquid crystal panel 60 in FIGS. 8a and 8b, the displayed image does not include a dark area that impedes visibility. However, if the height of the first support side member 30a does not fulfill the condition of Equation 2 as shown in FIG. 8c, less light is provided to the area S between the first support side member 30a and the light sources 10. If the image is displayed through the liquid crystal panel 60 in this configuration, the area S is relatively darker than the other areas.

If the first support side member 30a is positioned vertically on the lower surface of the bottom cover 70, the length of the first support side member 30a from the lower surface of the bottom cover 70 equals the height of the first support side member 30a from the lower surface of the bottom cover 70.

However, if the first support side member 30a is positioned at a slanted angle against the lower surface of the bottom cover 70, the length of the first support side member 30a differs from the height of the first support side member 30a from the lower surface of the bottom cover 70.

In one embodiment, since it is sufficient that the position where the first support side member 30a and the second support side member 30b are coupled at a slanted angle satisfies Equations 1 and 2, the first support side member 30a may be positioned at a slanted angle on the lower surface of the bottom cover 70.

Therefore, in one embodiment, the second support side member 30b is positioned at a slanted angle at both the other end of the first support side member 30a and the side of the bottom cover 70, and the first support side member 30a is positioned vertically or at a slanted angle on the lower surface of the bottom cover 70.

Angle α denotes the angle between the second support side member 30b and the lower surface of the bottom cover 70 and is provided by the following Equation 3.

$$\beta < \alpha \leq 90°$$ [Equation 3]

The angle α between the second support side member 30b and the lower surface of the bottom cover 70 is greater than the light orientation angle β with respect to the lower surface of the bottom cover 70 as expressed in Equation 3.

Since the second support side member 30b may change the path of the light provided by the light sources 10 only if the angle between the second support side member 30b and the lower surface of the bottom cover 70 is greater than the light orientation angle, the second support side member 30b is positioned relative to the first support side member 30a at a slanted angle that satisfies the condition of Equation 3.

However, if the angle α between the second support side member 30b and the lower surface of the bottom cover 70 exceeds 90°, the light of the light sources 10 may be reflected toward the bottom cover 70 instead of the liquid crystal panel 10. Therefore, an upper limit value exists in the angle α between the second support side member 30b and the lower surface of the bottom cover 70.

As described above, the support side 30 satisfying the conditions of Equations 1 to 3 may provide uniform light to prevent formation of a dark area in the edge area of the liquid crystal panel 60.

Also, the second support side member 30b of the backlight unit and the liquid crystal display device according to the first embodiment may include a scattering pattern for scattering the light provided from the light sources 10. The scattering pattern may include a convex pattern, a concave pattern, or both.

Also, a separate reflective unit or a perforated reflective unit may be included in the upper portion of the second support side member 30b. That is, the second support side member 30b may include a scattering pattern and a reflective unit or a perforated reflective unit, so as to scatter the light provided from the light sources 10 and extend the path of the light provided to the edge area of the liquid crystal panel 60.

Figure 9:
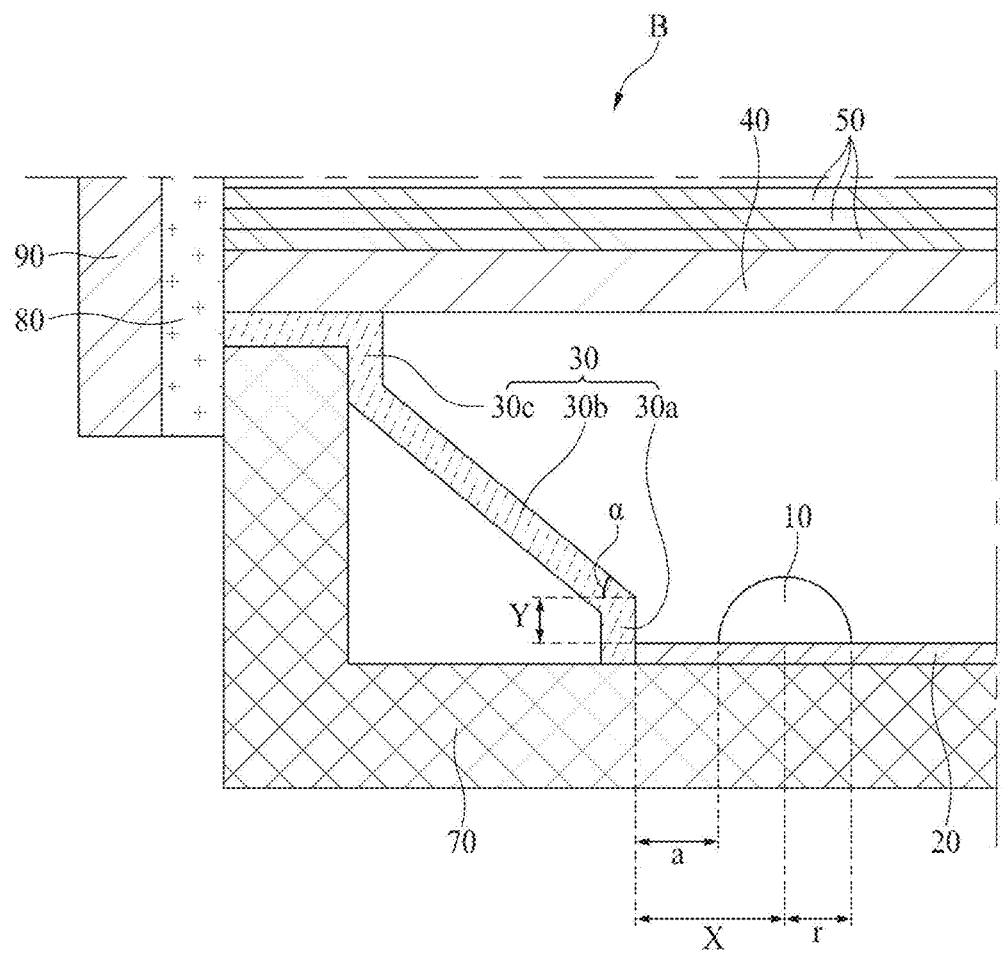
FIG. 9 is an enlarged cross-sectional view of area "B" illustrated in FIG. 5 in accordance with the second embodiment of a backlight unit.

FIG. 9 is an enlarged cross-sectional view of area "B" illustrated in FIG. 5 in accordance with the second embodiment backlight unit.

The backlight unit and the liquid crystal display device including the same in FIG. 9 have the same elements as those of the backlight unit and the liquid crystal display device including the same in FIG. 6 except that the support side 30 includes a first support side member 30a, a second support side member 30b, and a third support side member 30c. Therefore, the same reference numerals as those of FIG. 6 are given to the same elements as those of FIG. 6.

Referring to FIG. 9, the backlight unit according to the second embodiment includes a plurality of light sources 10 facing a rear surface of a liquid crystal panel 60, a bottom cover 70 for storing the plurality of light sources 10, and a support side 30 for changing a path of the light provided from the plurality of light sources toward the liquid crystal panel 60 on both ends of the plurality of light sources 10.

According to one embodiment, the plurality of light sources 10 may be LEDs or other point light sources having a hemisphere shape.

The support side 30 according to the second embodiment is positioned relative to the bottom cover 70 to change the path of the light in different directions in order to uniformly provide the light to an entire surface of the liquid crystal panel 60.

In detail, the support side 30 according to the second embodiment includes a first support side member 30a spaced apart from the light sources 10 at a predetermined distance, having one end positioned on the lower surface of the bottom cover 70, a second support side member 30b positioned at a slanted angle against the other end of the first support side member 30a, and a third support side member 30c to connect the second support side member 30b with a side of the bottom cover 70. The support side 30 changes the path of the light provided from the light sources 10 to different directions.

Since the support side 30 according to the second embodiment changes the path of light to provide light to the edge area of the liquid crystal panel 60, the second support side member 30b connects the other end of the first support side member 30a with the third support side member 30c to reflect the light of the light sources 10 toward the liquid crystal panel 60. The second support side member 30b is positioned at a slanted angle.

As described with respect to the first embodiment, the first support side member 30a and the second support side member 30b are disposed based on a predetermined condition to provide light to the edge area of the liquid crystal panel 60, such as the area S of FIG. 3.

If the second support side member 30b having a bar shape is formed on the first support side member 30 in accordance with Equations 1 and 2 at a predetermined angle α according to Equation 3, the end of second support side member 30b may not be positioned against the uppermost portion of the side of the bottom cover 70.

That is, if the second support side member 30b is formed in a bar shape, the second support side member 30b may be positioned against a portion of the side of the bottom cover 70 lower than the uppermost portion of the side of the bottom cover 70.

Therefore, in the second embodiment, the support side 30 further includes the third support side member 30c positioned against the side of the bottom cover 70. The third support side member is positioned against the uppermost portion at the side of the bottom cover 70. The second support side member 30b is coupled at a slanted angle to the other end of the first support side member 30a, which does not face the bottom cover 70, and to the third support side member 30c.

As the third support side member 30c is positioned against the uppermost portion of the side of the bottom cover 70, the third support side member 30c may more stably support the diffuser plate 40 and the optical sheet 50 together with the bottom cover 70.

Also, the third support side member 30c may be positioned to cover the upper portion of the side of the bottom cover 70 by which the diffuser plate 40 is supported, as shown in FIG. 9, in order to support the diffuser plate 40. However, the third support side member 30c may also be positioned at the side of the bottom cover 70 without being limited to the example of FIG. 9.

As described above, in the second embodiment, light is uniformly provided to the liquid crystal panel 60 through the first support side member 30a and the second support side member 30b, and the third support side member 30c may be positioned at the upper portion of the side of the bottom cover 70 to stably support the diffuser plate 40 and the optical sheet 50.

Hereinafter, a detailed condition for arrangement of the first support side member 30a and the second support side member 30b according to the second embodiment will be described.

First of all, the first support side member 30a is spaced apart from the light sources 10 at a predetermined distance as described above, and then is disposed on the lower surface of the bottom cover 70. In detail, a distance X from the first support side member 30a to the center of the light sources 10 is provided by Equation 1.

In detail, the first support side member 30a may be spaced apart from the center of the light sources 10 by as much as X given in Equation 1, or is disposed on the lower surface of the bottom cover 70 by being spaced apart from the outermost edge of the light sources 10 by as much as a.

That is, since it is difficult to provide light between the first support side member 30a and the light sources 10, the first support side member 30a is positioned at a distance within X from the center of the light sources 10.

If the first support side member 30a is positioned from the center of the light sources 10 by as much as a predetermined distance X or more as shown in FIGS. 7a to 7c, less light is provided to the area between the first support side member 30a and the light sources 10, which leads to formation of a dark area in the displayed image.

Also, a height Y of the first support side member 30a from the lower surface of the bottom cover 70 satisfies the condition of Equation 2.

As expressed by Equation 2, the first support side member 30a is longer by as much as a predetermined length b than the upper height of the bottom cover 70 through which light passes at the distance X spaced apart from the light sources 10.

If the height of the first support side member 30a does not fulfill the condition of Equation 2 as shown in FIGS. 8a to 8c, less light is provided to the area between the first support side member 30a and the light sources 10, which causes formation of a dark area is formed in the displayed image.

If the first support side member 30a is positioned vertically on the lower surface of the bottom cover 70, the length of the first support side member 30a extended from the lower surface of the bottom cover 70 equals the height of the first support side member 30a from the lower surface of the bottom cover 70.

However, if the first support side member 30a is positioned at a slanted angle on the lower surface of the bottom cover 70, the length of the first support side member 30a differs from the height of the first support side member 30a relative the lower surface of the bottom cover 70.

That is, in some embodiments, since it is sufficient that the position where the first support side member 30a and the second support side member 30b are coupled at a slanted angle to each other satisfies Equations 1 and 2, the first support side member 30a may be disposed at a slanted angle on the lower surface of the bottom cover 70.

Therefore, in some embodiments, the second support side member 30b is positioned at a slanted angle at both the other end of the first support side member 30a and the side of the bottom cover 70 as described above, and the first support side member 30a may be positioned vertically or at a slanted angle on the lower surface of the bottom cover 70.

Also, an angle α between the second support side member 30b and the lower surface of the bottom cover 70 satisfies Equation 3.

The angle α between the second support side member 30b and the lower surface of the bottom cover 70 is greater than the light orientation angle β of the light sources 10 with respect to the lower surface of the bottom cover 70 as expressed in Equation 3.

That is, since the second support side member 30b may change the path of the light provided from the light sources 10 only if the angle between the second support side member 30b and the lower surface of the bottom cover 70 is greater than the light orientation angle of the light sources 10, the second support side member 30b is positioned at a slanted angle from the first support side member 30a, where the angle satisfies the condition of Equation 3.

The third support side member 30c is coupled to one end of the second support side member 30b positioned at the side of the bottom cover 70 in accordance with the condition of Equation 3, and is positioned such that its one surface faces the uppermost portion of the side of the bottom cover 70.

However, if the angle α between the second support side member 30b and the lower surface of the bottom cover 70 exceeds 90°, the light of the light sources 10 may be reflected toward the bottom cover 70 rather than the liquid crystal panel 10. Therefore, an upper limit exists in the angle α between the second support side member 30b and the lower surface of the bottom cover 70.

As described above, the support side 30 fulfilling the conditions of the above Equations 1 to 3 may provide uniform light to prevent formation of a dark area in the edge area of the liquid crystal panel 60.

Also, the second support side member 30b or the third support side member 30c of the backlight unit and the liquid crystal display device according to the second embodiment may include a scattering pattern for scattering the light provided from the light sources 10. The scattering pattern may include a convex pattern, a concave pattern, or both.

Also, a separate reflective unit or a perforated reflective unit may be included in the upper portion of the second support side member 30b or the third support side member 30c. That is, the second support side member 30b or the third support side member 30c may include a scattering pattern and a reflective unit or a perforated reflective unit in order to scatter the light provided from the light sources 10 and extend the path of the light provided to the edge area of the liquid crystal panel 60.

Figure 10:
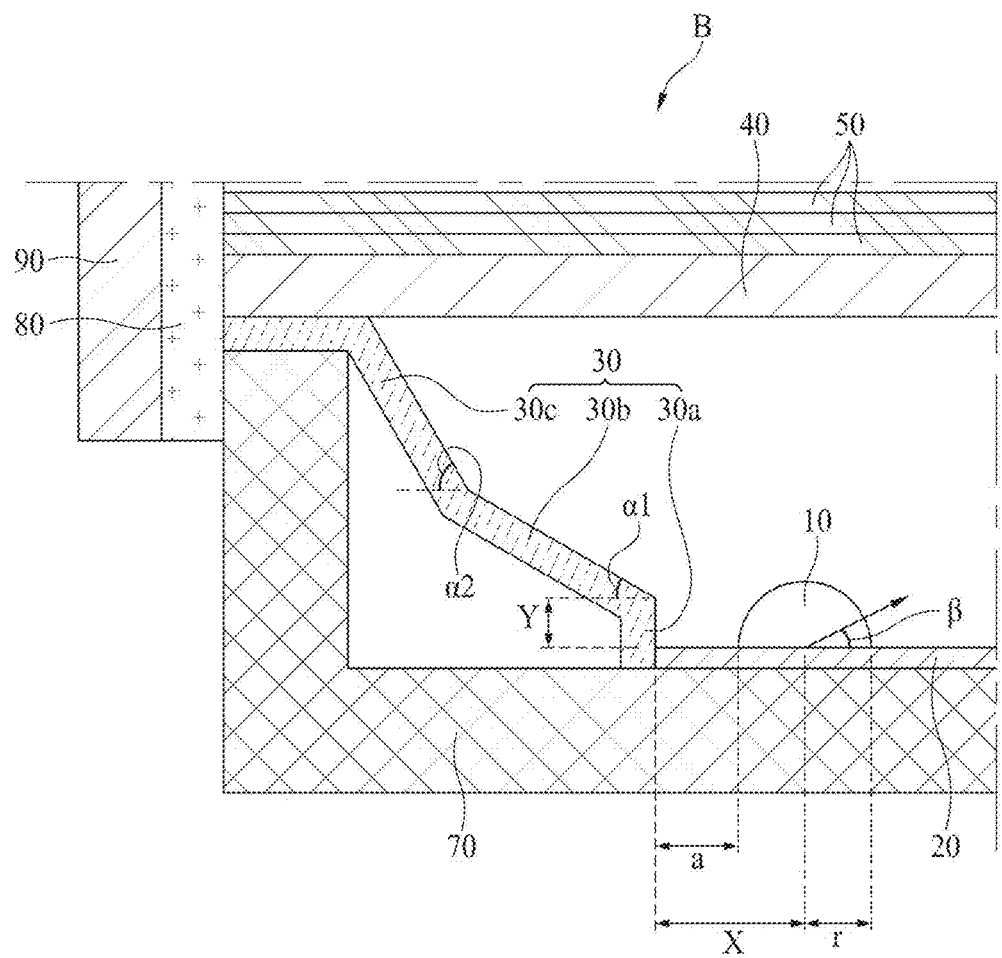
FIG. 10 is an enlarged cross-sectional view of area "B" illustrated in FIG. 5 in accordance with a third embodiment of a backlight unit.

FIG. 10 is an enlarged cross-sectional view of area "B" illustrated in FIG. 5 in accordance with a third embodiment of a backlight unit.

The backlight unit and the liquid crystal display device including the same in FIG. 9 have the same elements as those of the backlight unit and the liquid crystal display device including the same in FIG. 9 except that the support side 30 includes a first support side member 30a, a second support side member 30b, and a third support side member 30c, and the second support side member 30b and the third support side member 30c are positioned at different angles with respect to the lower surface of the bottom cover 70. Therefore, the same reference numerals as those of FIG. 9 are given to the same elements as those of FIG. 9.

Referring to FIG. 10, the backlight unit according to the third embodiment includes a plurality of light sources 10 facing a rear surface of a liquid crystal panel 60, a bottom cover 70 for storing the plurality of light sources 10, and a support side 30 for changing a path of the light provided from the plurality of light sources 10 toward the liquid crystal panel 60 on both ends of the plurality of light sources 10.

According to one embodiment, the plurality of light sources 10 may be LEDs having a hemisphere shape.

Particularly, the support side 30 according to the third embodiment includes a plurality of support side members respectively disposed at different positions relative to the bottom cover 70 such that a path of the light is changed in different directions in order to more uniformly provide light to an entire surface of the liquid crystal panel 60.

In detail, the support side 30 according to the third embodiment includes a first support side member 30a spaced apart from the light sources 10 at a predetermined distance, having one end disposed on the lower surface of the bottom cover 70, a second support side member 30b coupled to the other end of the first support side member 30a at a slanted angle, and a third support side member 30c having one end coupled at a slanted angle to the second support side member 30b and another end positioned at a slanted angle with respect to the side of the bottom cover 70. The support side 30 changes the path of the light provided from the light sources 10 to different directions.

Since the support side 30 according to the third embodiment changes the path of light to provide light to the edge area of the liquid crystal panel 60, the second support side member 30b is positioned at a slanted angle relative to the other end of the first support side member 30a and to the third support side member 30c to reflect the light of the light sources 10 toward the liquid crystal panel 60.

Also, the third support side member 30c according to the third embodiment is positioned to connect the second support side member 30b with the uppermost portion of the side of the bottom cover 70 to reflect the light of the light sources 10 toward the liquid crystal panel 60. Particularly, the third support side member 30c may be positioned to cover the upper portion of the bottom cover 70 by which the diffuser plate 40 is supported as shown in FIG. 10 to support the diffuser plate 40. However, the third support side member 30c may be positioned against the side of the bottom cover 70 without being limited to the example of FIG. 10.

As described with respect to the first embodiment, the first support side member 30a and the second support side member 30b are positioned based on a predetermined condition such that the light is provided to the edge area of the liquid crystal panel 60, such as the area S of FIG. 3.

If the second support side member 30b having a bar shape is formed on the first support side member 30a in accordance with Equations 1 and 2 at a predetermined angle α according to Equation 3, the end of the second support side member 30b may not be positioned at the uppermost portion of the side of the bottom cover 70.

In this way, if the second support side member 30b is formed in a bar shape, the second support side member 30b may be positioned against a portion of the side of the bottom cover 70 below the uppermost portion of the side of the bottom cover 70.

Therefore, in the third embodiment, the support side 30 further includes the third support side member 30c positioned at the uppermost portion of the side of the bottom cover 70, and the second support side member 30b is coupled at a slanted angle to the other end of the first support side member 30a, which does not face the bottom cover 70, and to the third support side member 30c.

As the third support side member 30c is positioned at the uppermost portion of the side of the bottom cover 70, the third support side member 30c may support the diffuser plate 40 and the optical sheet 50 more stably together with the bottom cover 70.

Hereinafter, a detailed condition for arrangement of the first support side member 30a, the second support side member 30b, and the third support side member 30c according to the third embodiment will be described.

First of all, the first support side member 30a is spaced apart from the light sources 10 at a predetermined distance as described above, and then is disposed on the lower surface of the bottom cover 70. In detail, a distance X from the first support side member 30a to the center of the light sources 10 satisfies Equation 1.

In detail, the first support side member 30a may be spaced apart from the center of the light sources 10 by as much as X as expressed in Equation 1, or is disposed on the lower surface of the bottom cover 70 by being spaced apart from the outermost edge of the light sources 10 by as much as a.

That is, since it is difficult to provide light between the first support side member 30a and the light sources 10, the first support side member 30a is disposed at a distance within X from the center of the light sources 10.

If the first support side member 30a is spaced apart from the center of the light sources 10 by as much as a predetermined distance X or more as shown in FIGS. 7a to 7c, less light is provided to the area between the first support side member 30a and the light sources 10, which results in formation of a dark area in a displayed image.

Also, a height Y of the first support side member 30a from the lower surface of the bottom cover 70 satisfies the condition of Equation 2.

As expressed by Equation 2, the first support side member 30a is longer by as much as a predetermined length b than the upper height of the bottom cover 70 through which light passes at the distance X spaced apart from the light sources 10.

If the height of the first support side member 30a does not satisfy the condition of Equation 2 as shown in FIGS. 8a to 8c, less light is provided to the area between the first support side member 30a and the light sources 10, which results in formation of a dark area in a displayed image.

Also, an angle $\alpha_1$ between the second support side member 30b and the lower surface of the bottom cover 70 and an angle $\alpha_2$ between the third support side member 30c and the lower surface of the bottom cover 70 satisfy the following Equation 4.

$$\beta < \alpha_1 < 90°$$

$$\alpha_1 < \alpha_2 \leq 90° \quad \text{[Equation 4]}$$

The angle $\alpha_1$ between the second support side member 30b and the lower surface of the bottom cover 70 is greater than the light orientation angle $\beta$ of the light sources 10 with respect to the lower surface of the bottom cover 70 as expressed in Equation 4.

That is, since the second support side member 30b may change the path of the light provided from the light sources 10 only if the angle between the second support side member 30b and the lower surface of the bottom cover 70 is greater than the light orientation angle of the light sources 10, the second support side member 30b is disposed relative to the first support side member 30a at a slanted angle that satisfies the condition of Equation 4.

The angle $\alpha_2$ between the third support side member 30c and the lower surface of the bottom cover 70 is greater than the angle $\alpha_1$ between the second support side member 30b and the lower surface of the bottom cover 70.

That is, the third support side member 30c may redirect light toward the liquid crystal panel 60 by reflecting light directed at the outside of the second support side member 30b or light having a path changed by the second support side member 30b toward the third support side member 30c only if the angle between the third support side member 30c and the lower surface of the bottom cover 70 is greater than the angle between the second support side member 30b and the lower surface of the bottom cover 70. Therefore, the third support side member 30c is disposed relative to the second support side member 30b and the side of the bottom cover 70 at a slanted angle that satisfies the condition of Equation 4.

However, if the angle $\alpha_1$ or $\alpha_2$ between the second support side member 30b or the third support side member 30c and the lower surface of the bottom cover 70 exceeds 90°, the light of the light sources 10 may be reflected toward the bottom cover 70 rather than toward the liquid crystal panel 10. Therefore, an upper limit value exists in the angle between the second support side member 30b or the third support side member 30c and the lower surface of the bottom cover 70 as expressed by Equation 4.

The support side 30 satisfying the conditions of Equations 1 to 4 may provide uniform light to prevent formation of a dark area in the edge area of the liquid crystal panel 60.

Also, the second support side member 30b or the third support side member 30c of the backlight unit and the liquid crystal display device according to the third embodiment may include a scattering pattern for scattering the light provided from the light sources 10. The scattering pattern may include a convex pattern, a concave pattern, or both.

Also, a separate reflective unit or a perforated reflective unit may additionally be included in the upper portion of the second support side member 30b or the third support side member 30c. That is, the second support side member 30b or the third support side member 30c may include a scattering pattern and a reflective unit or a perforated reflective unit, so as to scatter the light provided from the light sources 10 in order to extend the path of the light provided to the edge area of the liquid crystal panel 60.

Figure 11:
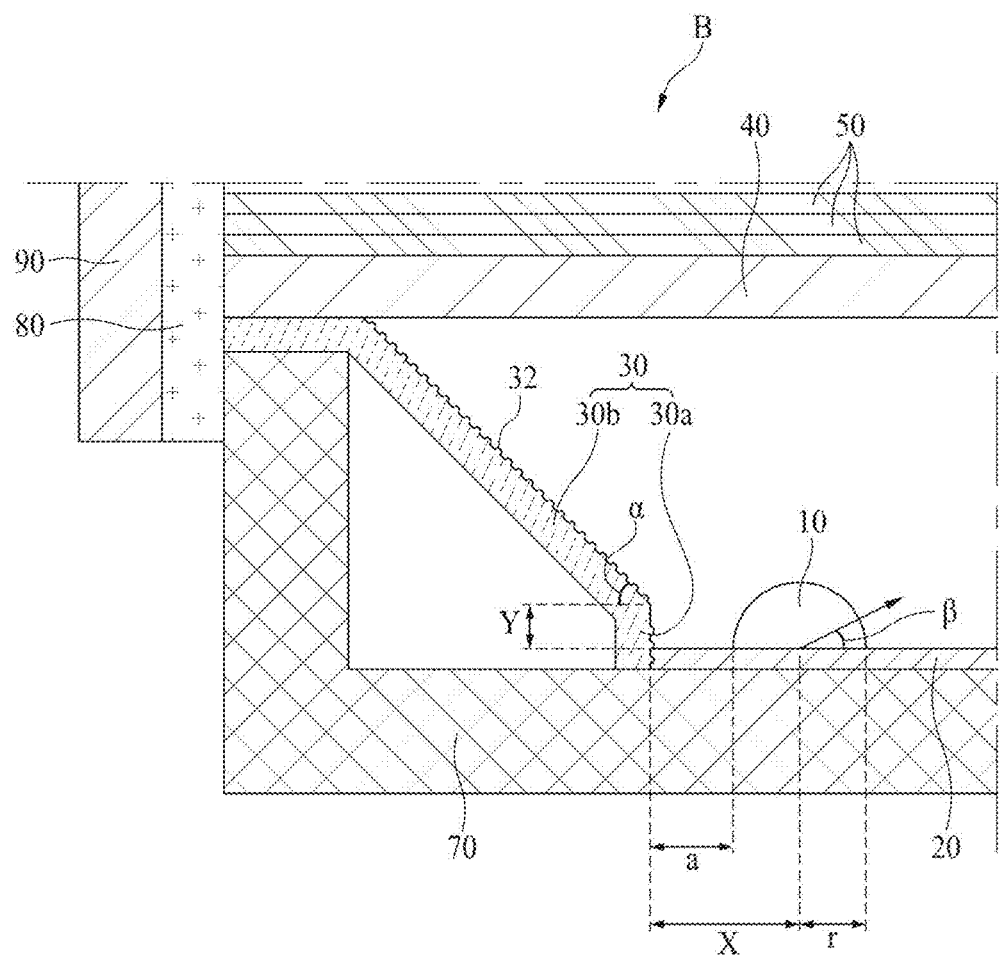
FIG. 11 is an enlarged cross-sectional view of area "B" illustrated in FIG. 5 in accordance with an embodiment of a backlight unit that includes a scattering pattern in a support side.

FIG. 11 is an enlarged cross-sectional view of area "B" illustrated in FIG. 5 in accordance with an embodiment of a backlight unit that includes a scattering pattern in a support side.

As shown in FIG. 11, the support side 30 according to some embodiments may include a scattering pattern 32 to scatter the light provided from the light sources 10 in order to extend the path of the light provided to the liquid crystal panel 60.

Although FIG. 11 illustrates the support side 30 according to the first embodiment modified to include a scattering pattern 32 having a convex shape, the disclosed embodiments are not limited to the example of FIG. 11. The support side 30 according to the second embodiment shown in FIG. 9, the third embodiment shown in FIG. 10, or other embodiments may include the scattering pattern 32, and the scattering pattern 32 may have a concave shape.

Figure 12:
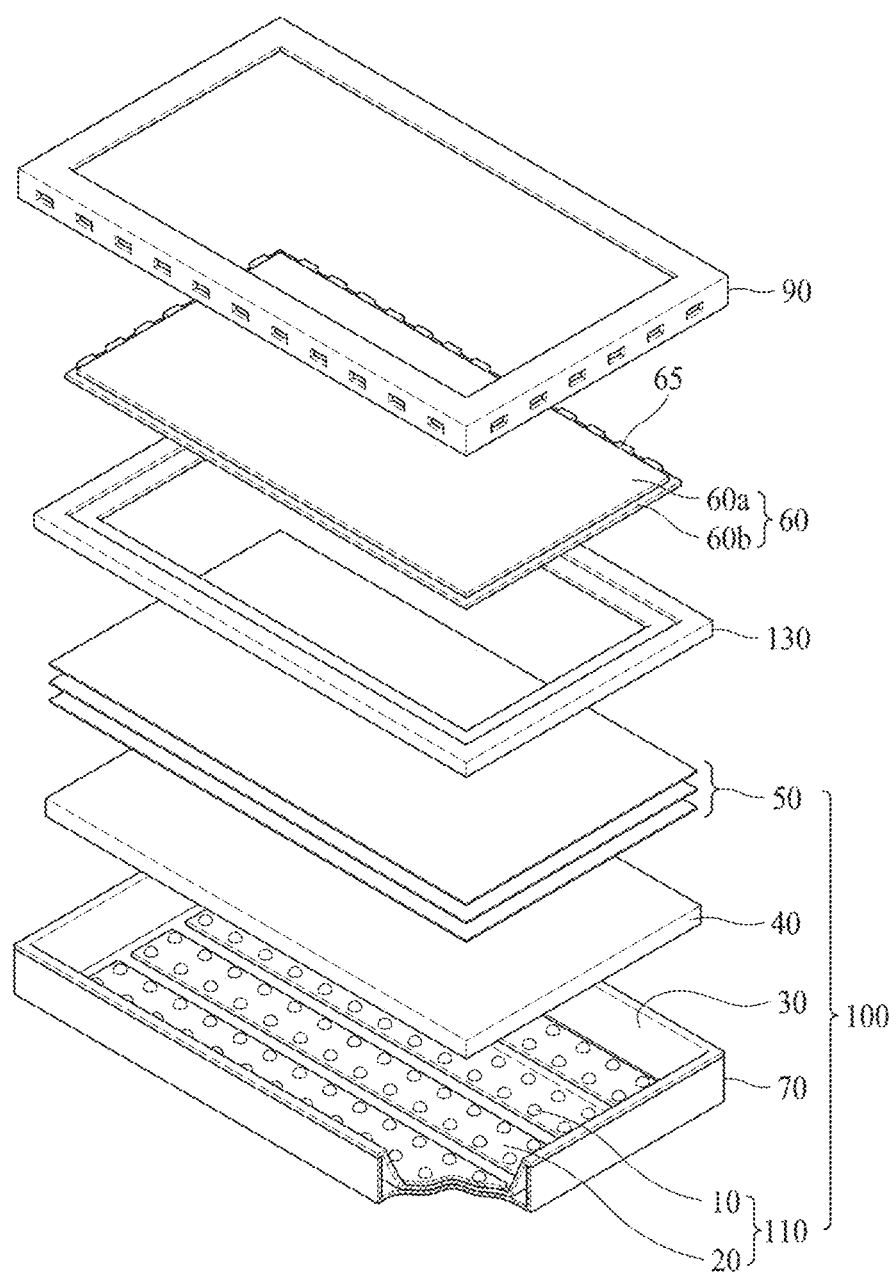
FIG. 12 is an exploded perspective view illustrating a liquid crystal display device including a backlight unit according to an embodiment.

FIG. 12 is an exploded perspective view illustrating a liquid crystal display device including a backlight unit according to one embodiment.

As shown in FIG. 12, the liquid crystal display device includes a liquid crystal panel 60, a backlight unit 100, a support main 130, a bottom cover 70, and a case top 90.

The liquid crystal panel 60 displays an image and includes an upper substrate 60a and a lower substrate 60b bonded to each other by interposing a liquid crystal layer therebetween.

Although not shown in FIG. 12, a plurality of gate lines cross a plurality of data lines to define pixels in the lower substrate 60b, and a thin film transistor (TFT) is disposed at each crossing point of the gate lines and the data lines corresponding to a transparent pixel electrode formed in each pixel.

Color filters having colors such as red (R), green (G), or blue (B) corresponding to each pixel are disposed in the upper substrate 60a. Also disposed on the upper substrate 60a is a black matrix that covers non-display elements such as the gate and data lines and the thin film transistor by surrounding each of the color filters. Also, the upper substrate 60a includes a transparent common electrode covering the color filters and the black matrix.

However, since the disclosed embodiment are not limited to the above structure, the aforementioned color filters may be disposed on the TFT of the lower substrate 60b, such as in a COT-type (Color filter On TFT) liquid crystal panel 60 without being formed in the upper substrate 60a.

A printed circuit board 65 is connected along at least one edge of the liquid crystal panel 60 through a connection member 66 such as a flexible printed circuit board (FPCB) or a tape carrier package (TCP).

The printed circuit board 65 may include a gate driving circuit for scan-transferring an on/off signal of the thin film transistor to each gate line and a data driving circuit for transferring an image signal per frame to the data lines. The gate driving circuit and the data driving circuit may be arranged at two neighboring edges of the liquid crystal panel 60.

In the liquid crystal panel 60 of the aforementioned structure, if the thin film transistor selected per gate line is turned on by the scan-transferred on/off signal of the gate driving circuit, a signal voltage of the data driving circuit is transferred to the corresponding pixel electrode through the data line. An alignment direction of liquid crystal molecules is varied by an electric field generated between the pixel electrode and the common electrode to cause a difference in transmittance.

Also, the liquid crystal display device according to some embodiments includes a backlight unit 100 providing light on a rear surface of the liquid crystal panel 60 to externally display the difference in transmittance.

The backlight unit 100 includes a light source package 110, a diffuser plate 40 disposed above the light source package 110, and a plurality of optical sheets 50.

The light source package 110 includes PCBs (not shown) arranged to have a certain spacing along a length direction of the bottom cover 70, a reflective unit 20, and a plurality of light sources 10. The reflective unit 20 and the plurality of light sources 10 are packaged in each of the PCBs.

A metal core PCB with a radiating function may be used as the PCB, and a radiator may be disposed on a rear surface of the metal core PCB to emit heat transferred from each light source 10 to the outside.

The plurality of optical sheets 50 may include various functional sheets such as reflective polarizing films called dual brightness enhancement films (DBEF) or prism sheets.

Therefore, the light provided from the plurality of light sources 10 enters the liquid crystal panel 60 after passing through the diffuser sheet 40 and the optical sheets 50, which increase the luminance of the image displayed by the liquid crystal panel 60.

The liquid crystal panel 60 and the backlight unit 100 are contained within the case top 90, the support main 130, and the bottom cover 70. The case top 90 has a section of a rectangular frame bent at a right angle to cover an upper surface and a side edge of the liquid crystal panel 60, and its surface has an open area to display an image on the liquid crystal panel 60.

Also, the bottom cover 70 serves as a bottom case for storing the backlight unit 100. To this end, each edge of the bottom cover 70 is elevated at a slanted angle, and the support side 30 is disposed on the bottom cover 70 to form a predetermined space therein.

Particularly, as described above, in this embodiment, the support side 30 may include the plurality of support side members respectively coupled to different positions of the bottom cover 70 to change the path of the light in different directions in order to provide uniform light to the liquid crystal panel 60 and to prevent darkness in the edge area of the liquid crystal panel 60.

Also, the rectangular shaped support main 130 that is placed on the bottom cover 70 and that surrounds corners of the liquid crystal panel 60 and the backlight unit 100 is coupled to the case top 90 and the bottom cover 70.

Moreover, although not shown, a multiple unit display device may be formed by arranging a plurality of liquid crystal display devices including backlight units having a plurality of support side members respectively disposed in different positions of the bottom cover 70 to change the path of the light in different directions including horizontal and vertical directions.

In the embodiments described above, the following example advantages may be obtained.

An image having uniform luminance may be provided by reducing darkness in the edge area of the liquid crystal panel.

Also, if the plurality of liquid crystal display devices, each of which includes a backlight unit according to the present invention, are combined into a multiple unit display device, an image having improved luminance uniformity may be provided through all of the liquid crystal display devices, where the backlight units reduce darkness around the edges of the center image.

It will be apparent to those skilled in the art that various modifications and variations can be made to the disclosed embodiments without departing from the spirit or scope of the inventions. Thus, it is intended that the disclosed embodiments include the modifications to and variations of the disclosed embodiments, provided they come within the scope of the appended claims and their equivalents.

What is claimed is:

1. A backlight unit comprising:
a plurality of point light sources facing a rear surface of a liquid crystal panel;
a bottom cover comprising a lower surface supporting the plurality of point light sources and a side surface disposed between the lower surface of the bottom cover and the liquid crystal panel; and
a support side in contact with the side surface of the bottom cover and in contact with the lower surface of the bottom cover in order to change a path of light from the plurality of point light sources toward the liquid crystal panel, the support side including:
a first support side member oriented at a first non-zero angle relative to the lower surface of the bottom cover; and
a second support side member coupled to the first support side member, the second support side member oriented at a second non-zero angle relative to the lower surface of the bottom cover, the second angle different than the first angle, and
wherein a distance a between an edge of the first support side member and an outermost edge of one of the plurality of point light sources is greater than or equal to 0 mm and less than or equal to 10 mm.

2. The backlight unit of claim 1, wherein the second support side member is coupled to the side surface of the bottom cover.

3. The backlight unit of claim 1, wherein a difference b between a height Y of the first support side member from the lower surface of the bottom cover and a lower illumination height of light from the plurality of point light sources on the first support side member is greater than or equal to 0 mm and less than or equal to 3 mm, the lower illumination height being equal to $X*\tan \beta$, where $\beta$ denotes a light orientation angle of the plurality of point light sources with respect to the bottom cover, and where X denotes a distance measured from the edge of the first support side member to a center of the one of the plurality of point light sources.

4. The backlight unit of claim 1, wherein an angle $\alpha$ between the second support side member and the lower surface of the bottom cover is less than 90° and greater than a light orientation angle $\beta$ of the plurality of point light sources with respect to the bottom cover.

5. The backlight unit of claim 1, wherein a distance X from the edge of the first support side member to a center of the one of the plurality of point light sources, a height Y of the first support side member from the lower surface of the bottom cover, and an angle $\alpha$ between the second support side member and the lower surface of the bottom cover satisfy $X=r+a$ (0 mm<a<10 mm), $Y=X*\tan \beta+b$ (0 mm<b<3 mm), and $\beta<\alpha<90°$, where r denotes a distance from the center of the one of the plurality of point light sources to another edge of the one of the plurality of point light sources, and where $\beta$ denotes a light orientation angle of the one of the plurality of point light sources with respect to the lower surface of the bottom cover.

6. The backlight unit of claim 1, wherein the support side further comprises:

a third support side member coupled to the second support side member, the third support side member oriented at a third non-zero angle relative to the lower surface of the bottom cover.

7. The backlight unit of claim 6, wherein the side surface of the bottom cover is angled relative to the lower surface of the bottom cover.

8. The backlight unit of claim 6, wherein the third non-zero angle is less than or equal to 90° and greater than the second non-zero angle.

9. The backlight unit of claim 6, wherein the third support side member is in contact with the side surface of the bottom cover.

10. The backlight unit of claim 1, wherein the support side includes a scattering pattern for scattering the light from the plurality of light sources.

11. The backlight unit of claim 1, wherein the support side contacts the side surface of the bottom cover below an uppermost portion of the side surface relative to the lower surface of the bottom cover.

12. The backlight unit of claim 1, wherein a portion of the support side covers an upper portion of the side surface of the bottom cover.

13. A liquid crystal display device comprising:
   a backlight unit; and
   a liquid crystal panel displaying an image by using light irradiated from the backlight unit,
   wherein the backlight unit includes:
      a plurality of point light sources facing a rear surface of the liquid crystal panel;
      a bottom cover comprising a lower surface supporting the plurality of point light sources and a side surface disposed between the lower surface of the bottom cover and the liquid crystal panel; and
      a support side in contact with the side surface of the bottom cover and in contact with the lower surface of the bottom cover in order to change a path of light from the plurality of point light sources toward the liquid crystal panel, the support side including:
         a first support side member oriented at a first non-zero angle relative to the lower surface of the bottom cover; and
         a second support side member coupled to the first support side member, the second support side member oriented at a second non-zero angle relative to the lower surface of the bottom cover, the second angle different than the first angle, and
      wherein a distance a between an edge of the first support side member and an outermost edge of one of the plurality of point light sources is greater than or equal to 0 mm and less than or equal to 10 mm.

14. The liquid crystal display device of claim 13, wherein the second support side member is coupled to the side surface of the bottom cover.

15. The liquid crystal display device of claim 13, wherein a distance X from the edge of the first support side member to a center of the one of the plurality of point light sources, a height Y of the first support side member from the lower surface of the bottom cover, and an angle α between the second support side member and the lower surface of the bottom cover satisfy X=r+a (0 mm<a<10 mm), Y=X*tan β+b (0 mm<b<3 mm), and β<α<90°, where r denotes a distance from the center of the one of the plurality of point light sources to another edge of the one of the plurality of point light sources, and where β denotes a light orientation angle of the one of the plurality of point light sources with respect to the lower surface of the bottom cover.

16. The liquid crystal display device of claim 13, wherein the support side further comprises:
   a third support side member coupled to the second support side member, the third support side member oriented at a third non-zero angle relative to the lower surface of the bottom cover.

17. The liquid crystal display device of claim 16, wherein the third non-zero angle is less than or equal to 90° and greater than the second non-zero angle.

18. The liquid crystal display device of claim 16, wherein the third support side member is in contact with the side surface of the bottom cover.

19. The liquid crystal display device of claim 13, wherein the support side includes a scattering pattern for scattering the light from the plurality of light sources.

* * * * *